June 7, 1955
H. MARX
2,709,944
APPARATUS FOR ACCURATELY LOCATING A REFLECTING
OBJECT AND FOR MEASURING ITS DIMENSIONS
Filed Sept. 16, 1953
3 Sheets-Sheet 2
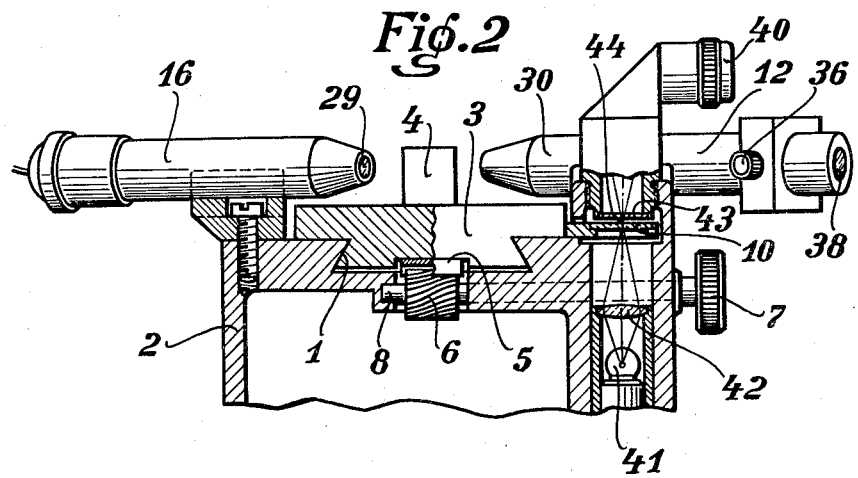
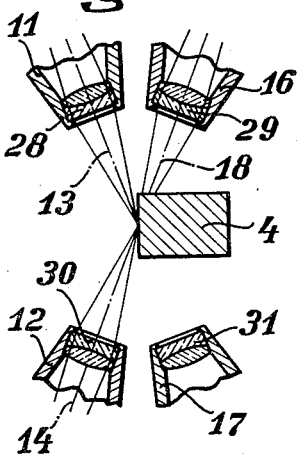
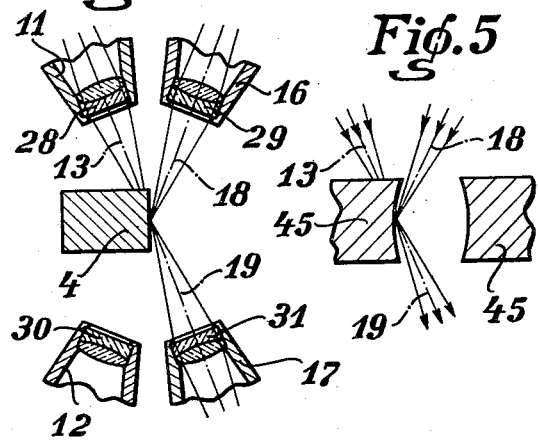
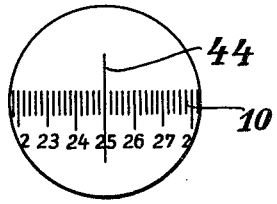
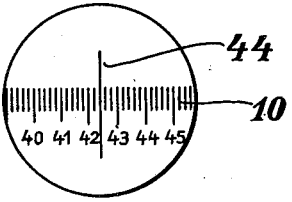
INVENTOR:
HELMUT MARX
BY
Richardson, David and Nordon
ATTYS June 7, 1955  H. MARX  2,709,944
APPARATUS FOR ACCURATELY LOCATING A REFLECTING
OBJECT AND FOR MEASURING ITS DIMENSIONS
Filed Sept. 16, 1953  3 Sheets-Sheet 3

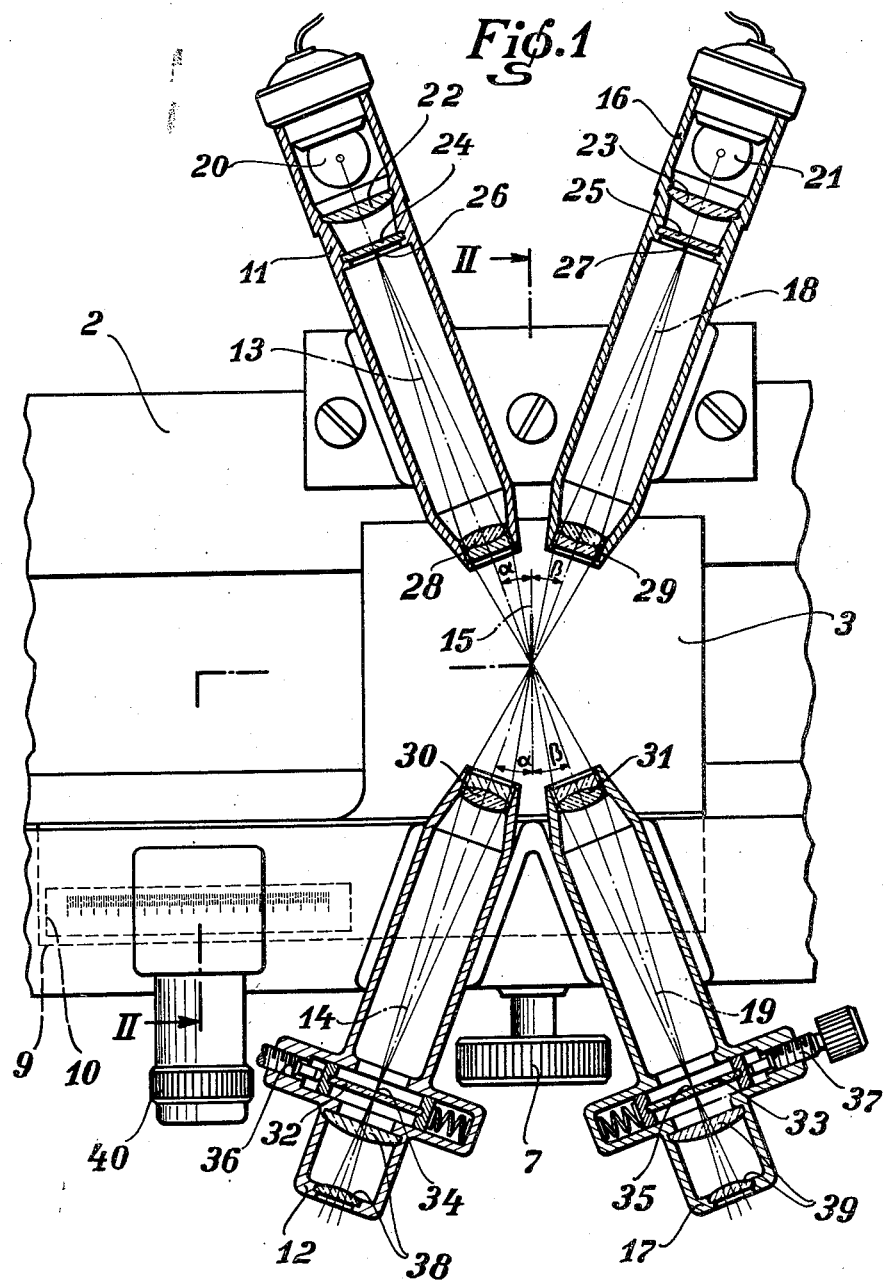

INVENTOR:
HELMUT MARX
BY
Richardson, David and Nordon
ATTYS

United States Patent Office 2,709,944
Patented June 7, 1955

2,709,944

APPARATUS FOR ACCURATELY LOCATING A REFLECTING OBJECT AND FOR MEASURING ITS DIMENSIONS

Helmut Marx, Wetzlar (Lahn), Germany, assignor to Ernst Leitz, G. m. b. H., Wetzlar, Germany Application September 16, 1953, Serial No. 380,403

Claims priority, application Germany September 22, 1952

5 Claims. (Cl. 88—14)

The present invention relates to an apparatus for accurately locating a reflecting object with a selected boundary portion thereof in a predetermined plane of reference and more particularly to an apparatus for accurately measuring the dimensions of a reflecting object by determining the exact distance between two selected opposite boundary surface portions thereof.

It has been proposed to measure the dimensions of a reflecting object by a method in which a beam of rays is projected along an optical axis located in a predetermined plane of reference to produce in said plane an air image of a measuring mark. A second image of the measuring mark is reproduced in the ocular of an observation instrument arranged with its optical axis coinciding with that of the projected beam. The reflecting object or test piece is placed in a position in which the normal to the selected opposite surface portions thereof passes through the air image of the measuring mark at right angles to the plane of reference and the object is then shifted along said normal into the beam of rays and its position is adjusted until the directly produced image of the measuring mark coincides in the ocular of the observation instrument with a second image of the same mark produced by rays reflected from one of the selected surface portions of the test piece. This first adjusted position of the test piece, which may for example be mounted on a sliding support provided with a measuring scale, is then ascertained by means of an instrument of known type, such as for instance a comparator including a microscope. Next, the support carrying the test piece is shifted further along said normal until its surface containing the second selected boundary surface portion is located within the beam of rays, and its position is again adjusted until the directly produced image of the measuring mark coincides with a second image thereof which is now produced by the rays reflected from said second selected surface portion of the test piece. The second adjusted position of the support is again read on the measuring scale by means of the comparator. The distance through which the test piece has been moved from its first adjusted position to its second adjusted position is obtained from the two comparator readings. It corresponds to the distance between the two selected opposite surface portions, and thus gives the exact length, for example of a precision gauge block.

In the execution of this known method, only a semicircle is illuminated in the field of view of the observation instrument because a single image producing optical system is used. As a result, the geometrical aberrations of the objectives are more noticeable than they would be if a full circle were illuminated. If the test piece is curved concavely relative to the optical axis of the beam in the plane formed by said optical axis and the normal of the selected surface portions of the test piece, part of the illuminated aperture is cut off by the protruding edge of the test piece. This causes various measuring errors, depending upon the cut off portion, even if the measuring error resulting from the illumination of a semi-circle is compensated by suitable gauging of the instrument.

It is a principal object of the present invention to eliminate the various objectionable features of the known method.

Another object of the invention is to provide an apparatus for locating and measuring the dimensions of a reflecting object by which such object can be accurately located and measured with the aid of beams of rays illuminating a full circle in the field of view of an observation instrument.

Still another object of the invention is to provide an apparatus which permits the accurate locating and measuring of reflecting objects at selected boundary surface portions thereof contained in concavely curved boundary surfaces of the object. A still further object of the invention is to combine two projectors with two observation instruments in such a manner that observation and measuring errors are eliminated.

These and other objects which will appear more clearly as the specification proceeds are accomplished, according to the present invention, by the methods and combination of apparatus elements set forth in the following detailed description, defined in the appended claims, and illustratively exemplified in the accompanying drawings in which:

Fig. 1 is a plan view of a measuring apparatus according to the invention, some parts being shown in horizontal section;

Fig. 2 is a section on line II—II of Fig. 1;

Fig. 3a shows diagrammatically the path traversed by the rays when a first selected boundary surface portion of a reflecting object is positioned in the plane of reference;

Fig. 4a represents the field of view in the ocular of a comparator when the object assumes the adjusted position in accordance with Fig. 3a;

Fig. 3b shows diagrammatically the path traversed by the rays when the second selected boundary surface portion of the reflecting object is positioned in the plane of reference;

Fig. 4b represents the field of view in the ocular of the comparator when the object assumes the position according to Fig. 3b;

Fig. 5 shows diagrammatically the path traversed by the rays when a selected portion of a concave boundary surface of a reflecting object is positioned in the plane of reference;

Figure 6A:
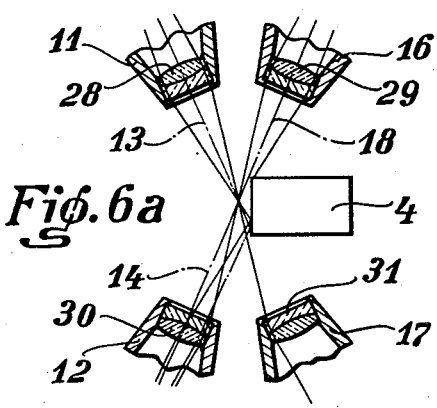
Figs. 6a, 6b and 6c show the paths traversed by the rays of a projected beam at various stages of the adjustment of a reflecting object to the position in which its selected boundary surface portion is located in the plane of reference.

Referring now to the drawings and first to Fig. 2 thereof, reference numeral 2 designates a stationary support. A sliding carriage 3 is guided in a dovetail groove 1 provided in the upper surface of the support 2. The reflecting object or test piece 4 to be measured has opposite parallel surfaces and rests on the carriage 3. The carriage 3 can be shifted along the dovetail groove 1 by means of a rack 5 and worm wheel 6 keyed to a shaft 8 provided with a knurled knob 7. A lateral extension 9 of the carriage 3 is provided with a transparent scale 10.

A first projector 11 and a first observation instrument 12 are carried by the support 2 on one side of a plane of reference 15 (see Fig. 1) extending perpendicular to the direction of movement of the carriage 3 along the dovetail groove 1. The projector 11 and observation instrument 12 have a common focus point in the plane of reference 15 and their optical axes 13 and 14, respectively, form with the plane 15 identical angles α which are smaller than 90°. A second projector 16 and a second observation instrument 17 are carried by the support 2 on the other side of the plane 15. The projector 16 and observation instrument 17 have a common focus point in the plane 15 coinciding with the common focus point of the projector 11 and observation instrument 12, and their optical axes 18 and 19, respectively, form with the plane 15 identical angles β which are smaller than 90°. In the illustrated embodiment of the invention all the optical axes 13, 14, 18 and 19 are located in one and the same horizontal plane and the angles α and β are equal to each other.

Figure 7A:
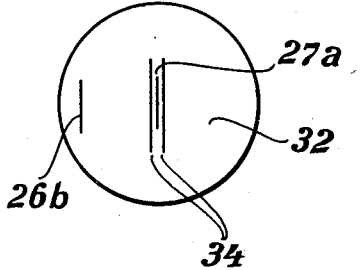
Figs. 7a, 7b and 7c represent the field of view of an observation instrument when the object assumes the positions according to Figs. 6a, 6b and 6c, respectively.
Figure 6B:
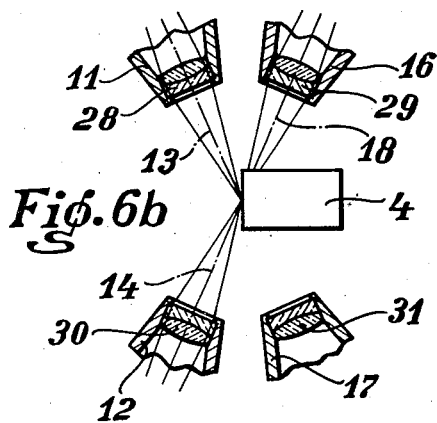
Figure 7B:
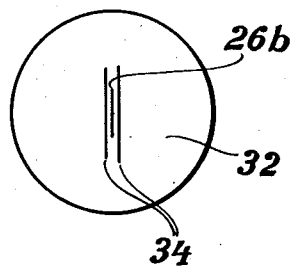
Figure 6C:
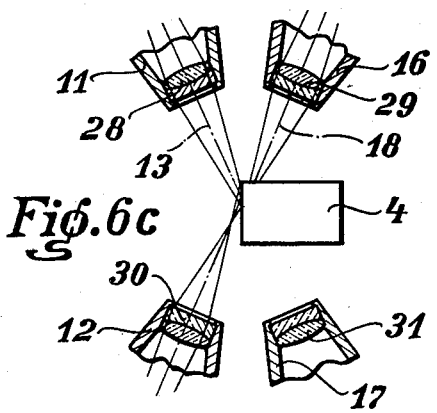
Figure 7C:
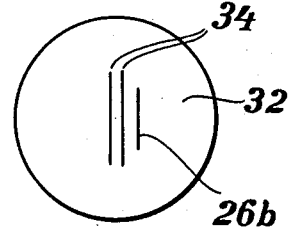

Each of the projectors 11 and 16 comprises a light source 20, 21, a collector lens 22, 23, a transparent plate 24, 25 provided with a measuring mark 26, 27 and an objective 28, 29, respectively. Each of the observation instruments 12 and 17 comprises an objective 30, 31, a ground glass plate 32, 33 provided with a double lined gauge mark 34, 35 (see Figs. 7a to 7c), and an ocular 38, 39 respectively. The ground glass plates 32 and 33 can be shifted in their own planes at right angles to the optical axis of the observation instrument with which they are associated by means of adjusting devices 36 and 37, respectively. Each of the adjusting devices 36 and 37 includes an adjusting screw acting upon one edge of the corresponding plate 32, 33, respectively, and a counteracting spring pressing against the opposite edge of said plate.

A microscope assembly 40 is arranged on the support 2 so as to permit observation of the transparent scale 10, as shown in Fig. 2, this assembly includes a light source 41 and a collector lens 42 below the scale 10 and a transparent plate 43 provided with a reference mark 44 (see Figs. 3b and 4b).

A measuring operation according to the present invention may be carried out as follows:

The light sources 20 and 21 in the projectors 11 and 16 are turned on to produce in the common focus point of the projected beams in the plane of reference 15 coinciding air images of the measuring marks 26 and 27 respectively. The beam emitted by the projector 11 also produces an accurately adjusted second direct image of the measuring mark 26 on the ground glass plate 33 of the measuring instrument 17 on the opposite side of plane 15 and, correspondingly, the beam emitted by the projector 16 produces an accurately adjusted second direct image 27a of the measuring mark 27 on the ground glass plate 32 of the observation instrument 12. The ground glass plates 32, 33 are then adjusted by means of the adjusting screws until the second direct image 27a of the measuring mark 27 is adjusted in the double line gauge mark 34 on the ground glass plate 32 (see Fig. 7a), and the second direct image of the measuring mark 26 is adjusted in the double line of the gauge mark 35 on the ground glass plate 33 of observation instrument 17.

The object or test piece 4 to be measured is mounted on the carriage 3 in a position in which the normal of the two selected opposite and substantially parallel surface portions thereof at which the measurement is to be taken passes through the common focus at right angles to the plane 15 and the carriage 3 is shifted by turning of the knob 7 to move the test piece 4 into the beams of rays emitted by the projectors 11 and 16, respectively.

When the lefthand boundary surface of the test piece 4 (as seen in the drawings) intercepts the beam of rays emitted by the projector 11, this beam is reflected from the surface of the object 4 into the objective 30 of the observation instrument 12 and produces a reflected image 26b of the measuring mark 26 in the field of view of the ocular 38. The reflected image 26b appears first beside the directly produced second image 27a of the measuring mark 27 (see Fig. 7a). By further turning the knob 7, the test piece 4 is advanced further into the beam of rays of the projectors 11 and 16 respectively. As the lefthand boundary surface of the test piece 4 approaches the plane 15, the reflected image 26b approaches the gauge marks 34, while simultaneously the direct image 27a fades out and eventually disappears. When the first selected boundary surface portion of the test piece 4 has reached the plane 15, the reflected image 26b is centered between the double line of the gauge mark 34 (see Fig. 7b). At this point the position of the carriage 3 is read on the scale 10 by means of the microscope 40 (see Figs. 3a and 3b). On further turning of the knob 7 in the same direction, the reflected image 26b shifts back to the left side of the double line gauge mark 34 (see Fig. 7c).

Turning of the knob 7 in the same direction is continued until the second (righthand) selected boundary surface portion of the test piece 4 approaches plane 15, and the reflected image of the measuring mark 27 appears in the field of view of the observation instrument 17. The carriage 3 is adjusted until this reflected image is centered in the double line of the gauge mark 35, and the second adjusted position of the carriage 3 is read again on the scale 10 by means of the microscope 40 (see Figs. 4a and 4b). The difference between the two readings on the scale 10 (Figs. 3b and 4b) corresponds to the distance between the selected surface portions of the object and thus determines the dimensions of the object.

The employment of two projectors and two observation instruments also permits accurate locating and measuring of concave objects 45 (see Fig. 5).

While preferred embodiments of the method and apparatus according to the present invention have been described and illustrated, it is to be understood that various changes and modifications will be apparent to those skilled in the art and that the scope of the invention is not intended to be limited except as defined in the following claims.

I claim:

1. A device for accurately locating a reflecting object with a selected boundary surface portion thereof in a given plane of reference, comprising a projector arranged on one side of said plane and adapted to project a beam of rays towards said plane along a first optical axis extending at an angle of less than 90° to said plane, said projector including means for focusing said beam in said plane, said projector further including a measuring mark so positioned in the path of the projected beam of rays that an image is produced in the focus of the beam, a carriage for supporting a reflecting object in a position in which the normal of a selected surface portion thereof passes through the focus of the beam at right angles to the plane of reference, and the boundary surface of the object containing said selected surface portion intercepts the beam of rays emitted by said projector, means for shifting said carriage at right angles to said plane, and an observation instrument arranged on the same side of said plane of reference as said projector with its optical axis passing through the focus of said beam at an angle relative to said plane which is equal to the angle between said first optical axis and said plane to permit observation of the beam reflected from the boundary surface of the reflecting object, said observation instrument including an ocular and optical elements for producing a reflected image of said measuring mark in said ocular when the projected beam is reflected from said boundary surface of a reflecting object into said observation instrument, said ocular being provided with a gauge mark so positioned that the reflected image of the measuring mark assumes a predetermined position relative to said gauge mark when the selected boundary surface portion of a reflecting object is located accurately in said plane of reference.

2. A device for accurately measuring the dimensions of a reflecting object by determining the distance between two selected opposite substantially parallel surface portions thereof, said device comprising two projectors arranged on opposite sides of a common plane of reference, and each adapted to project a beam of rays towards said plane of reference along an optical axis extending at an angle of less than 90° to said plane, each projector including means for focusing the projected beam in said plane at a common focus point, each of said projectors further including a measuring mark so positioned in the path of the projected beam of rays that an image thereof is produced in said common focus point, a carriage for supporting a reflecting object to be measured in a position in which the normal of two selected opposite surface portions thereof passes through said common focus point at right angles to said plane, means for shifting said carriage at right angles to said plane to permit positioning of the object for interception of one of the beams by one of its two boundary surfaces containing the selected surface portions, two observation instruments arranged at opposite sides of said plane and each having an optical axis passing through said common focus point at an angle relative to said plane which is equal to the angle between the optical axis of the projector on the same side of the plane and the latter to permit observation of the beams reflected from one or the other boundary surface of a reflecting object when the carriage is moved to a position in which such boundary surface intercepts one of said projected beams, each of said observation instruments including an ocular and optical elements for producing in the associated ocular a reflected image of the measuring mark provided in the projector on the same side of the plane of reference, the ocular of each observation instrument being provided with a guage mark so positioned that the image of a measuring mark reflected from one of the selected boundary surface portions of a reflecting object into said observation instrument assumes a predetermined position relative to said gauge mark when such selected boundary surface portion is located accurately in said plane of reference, and means for accurately determining the distance through which the carriage is moved from its position in which the beam reflected from one boundary surface of the object assumes a predetermined position relative to the optical axis of the associated observation instruments to the position in which the beam reflected from the other boundary surface of the object assumes a predetermined position relative to the optical axis of the other observation instrument.

3. A device, as claimed in claim 2, in which all such optical axes are located in a common plane and the angles between all said optical axes and said plane of reference are equal so that the optical axis of each projector coincides with the optical axis of the observation instrument on the opposite side of the plane of reference, whereby, in the absence of a boundary surface of said reflecting object, in the ocular of each observation instrument there is produced a second accurately centered image of the measuring mark provided in the projector on the opposite side of the plane of reference when the beam from said projector is permitted to enter the observation instrument, the ocular of each observation instrument being provided with a gauge mark adjustable in a plane at right angles to the optical axis of the instrument to permit accurate location of said gauge mark relative to said second image of the measuring mark provided in the projector on the opposite side of the plane of reference.

4. A device according to claim 1, including means for accurately determining the extent to which said carriage is shifted.

5. A device for measuring the distance between two substantially parallel reflecting surface portions of a specimen, comprising a pair of projectors disposed to project a beam of rays at the same acute angle to a common point of a reference plane from opposite sides of said plane, a pair of observation instruments of which one is disposed on one side of said plane and the other is disposed on the other side of said plane, respectively, and having optical axes passing through said common point at said same acute angle, respectively, means for moving said object in transverse direction to said plane with said surface portions substantially parallel to said plane, and means for measuring the extent of movement of said object, whereby the distance between said surface portions corresponds to the extent of movement of said object from a position where one of said portions is in said plane until the other of said portions is in said plane, the disposition of said portions relative to said plane being determined by the receipt of a reflected beam from a projector to its corresponding observation instrument.

References Cited in the file of this patent

UNITED STATES PATENTS

| | | |
|---|---|---|
| 1,756,785 | Gallasch | Apr. 29, 1930 |
| 1,973,066 | Hauser et al. | Sept. 11, 1934 |

FOREIGN PATENTS

| | | |
|---|---|---|
| 615,226 | Great Britain | Jan. 4, 1949 |